United States Patent
Ahmad et al.

(10) Patent No.: US 9,032,359 B1
(45) Date of Patent: May 12, 2015

(54) METHOD AND APPARATUS FOR MODIFYING A PLATFORM-INDEPENDENT PROGRAMMING LANGUAGE BUILD TOOL

(75) Inventors: Saqib J. Ahmad, Santa Clara, CA (US); Sebastian Hans, Berlin (DE)

(73) Assignee: Oracle America, Inc., Redwood Shores, CA (US)

( * ) Notice: Subject to any disclaimer, the term of this patent is extended or adjusted under 35 U.S.C. 154(b) by 2317 days.

(21) Appl. No.: 11/266,845

(22) Filed: Nov. 3, 2005

(51) Int. Cl.
*G06F 9/44* (2006.01)

(52) U.S. Cl.
CPC ................................ *G06F 8/311* (2013.01)

(58) Field of Classification Search
None
See application file for complete search history.

(56) References Cited

U.S. PATENT DOCUMENTS

| | | | |
|---|---|---|---|
| 6,845,498 B1 * | 1/2005 | Odinak et al. | 717/100 |
| 7,203,477 B2 * | 4/2007 | Coppinger et al. | 455/403 |
| 7,203,485 B2 * | 4/2007 | Coppinger et al. | 455/418 |
| 2001/0046862 A1 * | 11/2001 | Coppinger et al. | 455/435 |
| 2005/0081187 A1 * | 4/2005 | Odinak et al. | 717/101 |
| 2005/0169475 A1 * | 8/2005 | Camus et al. | 380/252 |
| 2008/0040279 A1 * | 2/2008 | Coppinger et al. | 705/44 |

\* cited by examiner

*Primary Examiner* — Li B Zhen
*Assistant Examiner* — Evral Bodden
(74) *Attorney, Agent, or Firm* — Park, Vaughan, Fleming & Dowler LLP

(57) ABSTRACT

One embodiment of the present invention provides a system that facilitates modifying a platform-independent programming language build tool to aid in the development and testing of smart card applications. The system operates by creating a task in the platform-independent programming language build tool that allows a user to perform functions associated with the development and testing of smart card applications. Next, the system extends the platform-independent programming language build tool interface to include the task so that the task is executable by the user. Note that making the task part of the platform-independent programming language build tool interface reduces the overhead involved in performing functions associated with developing and testing smart card applications.

20 Claims, 3 Drawing Sheets

METHOD AND APPARATUS FOR MODIFYING A PLATFORM-INDEPENDENT PROGRAMMING LANGUAGE BUILD TOOL

BACKGROUND

1. Field of the Invention

The present invention relates to development tools for computer software. More specifically, the present invention relates to a method and an apparatus for modifying a platform-independent programming language build tool.

2. Related Art

As applications and programming languages are becoming more complex, programmers are increasingly using "build tools" to help develop and maintain their applications. Build tools help programmers manage files and classes, as well as simplifying many of the tasks programmers perform while developing applications.

However, build tools are not without their limitations. Build tools often provide tasks and commands that cover basic programming language functions; however, they typically do not provide easy access to language extensions or third-party functions that may be required for specific applications. Often when a programmer needs to utilize a function from a third party, or a function that is not common for the majority of developers, the programmer uses a generic build tool task and manually specifies all of the necessary information for the function in question. If an application uses these functions extensively, using a generic build tool can be almost as time-consuming and complex as not using a build tool.

Hence, what is needed is a method for increasing the versatility of a build tool without the problems listed above.

SUMMARY

One embodiment of the present invention provides a system that facilitates modifying a platform-independent programming language build tool to aid in the development and testing of smart card applications. The system operates by creating a task in the platform-independent programming language build tool that allows a user to perform functions associated with the development and testing of smart card applications. Next, the system extends the platform-independent programming language build tool interface to include the task so that the task is executable by the user. Note that making the task part of the platform-independent programming language build tool interface reduces the overhead involved in performing functions associated with developing and testing smart card applications.

In a variation of this embodiment, the programming language is the Java™ programming language.

In a variation of this embodiment, the platform-independent programming language build tool is the Apache Ant Java build tool.

In a variation of this embodiment, the smart card is a Java Card™.

In a variation of this embodiment, the task is a bridge to a predefined external task. In this variation, the system passes parameters associated with the task to the predefined external task.

In a further variation, the predefined external task can include a Java Card Application Protocol Data Unit (APDU) tool, a Java Card converter tool, a Java Card verification tool, a Java Card CAP file generation tool, a Java Card mask generation tool, a Java Card script generation tool, or a Java Card deployment tool.

In a variation of this embodiment, extending the platform-independent programming language build tool interface involves creating an Application Programming Interface (API) which facilitates activating the task.

TABLE 1 illustrates exemplary usage of a converter task in accordance with an embodiment of the present invention.

TABLE 2 illustrates exemplary usage of an "export-to-text" task in accordance with an embodiment of the present invention.

TABLE 3A illustrates exemplary usage of a "verify-CAP-file" task in accordance with an embodiment of the present invention.

TABLE 3B illustrates exemplary usage of a "verify-revision" task in accordance with an embodiment of the present invention.

TABLE 3C illustrates exemplary usage of a "verify-export" task in accordance with an embodiment of the present invention.

TABLE 4 illustrates exemplary usage of a "script-generation" task in accordance with an embodiment of the present invention.

TABLE 5 illustrates exemplary usage of a deployment task in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Smart Card

Figure 1:
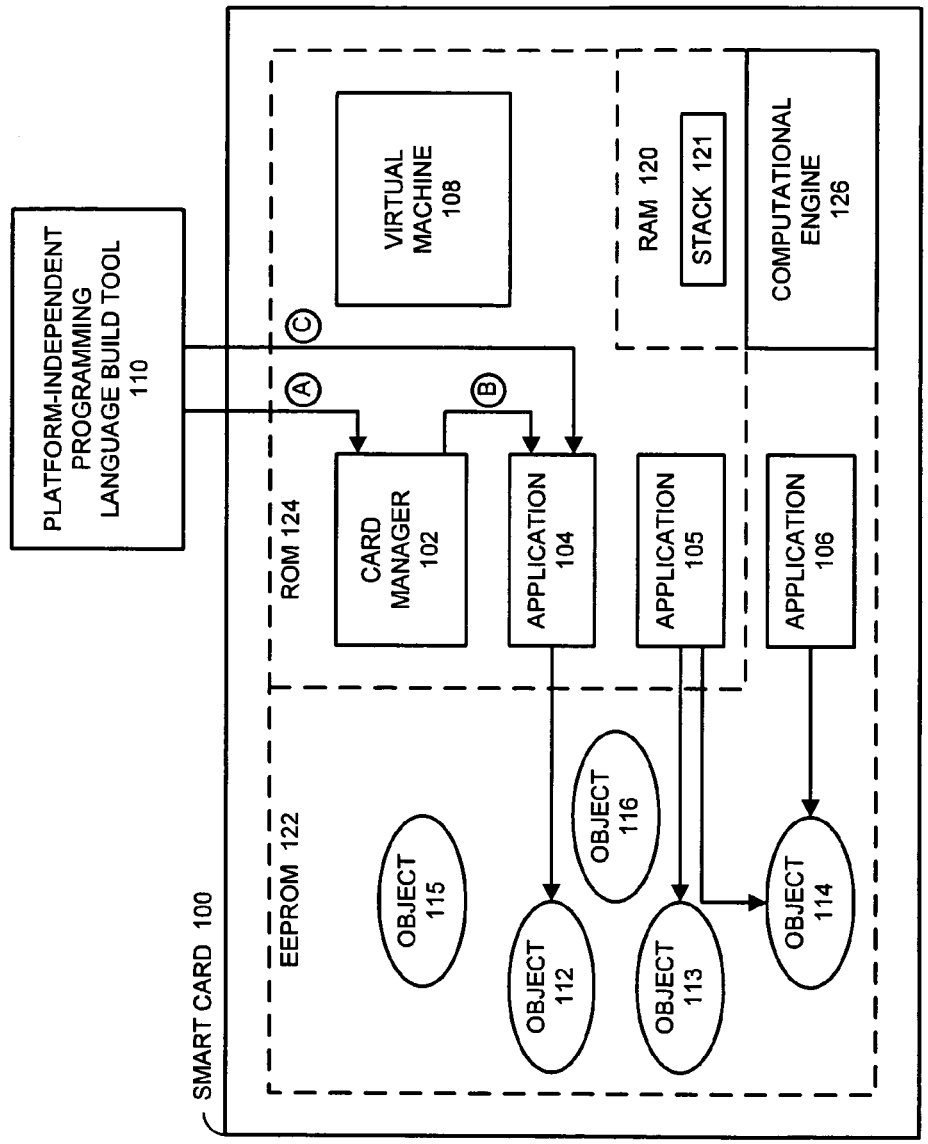
FIG. 1 illustrates a smart card 100 in accordance with an embodiment of the present invention.

FIG. 1 illustrates a smart card 100 in accordance with an embodiment of the present invention. Smart card 100 can generally include any type of miniature computing device, such as may be located within identification cards, client loyalty cards, electronic wallets, data cards and cellular telephones. However, note that the present invention is not meant to be limited to smart cards, and can generally be applied to any type of computing device or computer system that stores objects in writeable non-volatile memory.

Smart card 100 contains a computational engine 126, which includes circuitry for performing computational operations. Smart card 100 also contains a number of different types of memory, including random access memory (RAM) 120, electrically erasable programmable read-only memory (EEPROM) 122 and read-only memory (ROM) 124.

In general, RAM 120 can include any type of volatile random access memory; EEPROM 122 can include any type of writeable non-volatile memory, such as EEPROM, flash memory, or magnetic memory; and ROM 124 can include any type of read-only memory.

RAM 120 is used to store various data items and data structures, such as a system stack 121. System stack 121 is described in more detail below with reference to FIG. 3.

ROM 124 includes a virtual machine 108, such as the JAVA virtual machine developed by SUN Microsystems, Inc. of Santa Clara, Calif. Note that applications written in a platform-independent programming language, such as the JAVA programming language, can be executed on virtual machine 108. Also note that in one embodiment of the present invention, smart card 100 is a Java Card™.

ROM 124 also contains a number of applications, 104 and 105, which provide services for clients accessing smart card 100. Other applications, such as application 106, can be located in EEPROM 122. Yet other applications (not illustrated) may be located in both ROM 124 and EEPROM 122.

ROM 124 may also include a card manager 102, which contains code for managing the execution of applications on smart card 100. For example, suppose a platform-independent programming language build tool 110 wishes to access a service provided by one of the applications 104-106 on smart card 100. (Note that platform-independent programming language build tool 110 may access a service provided by one of the applications 104-106 directly, or through a third-party set of tools such as the Java Card tools in the Java Card reference implementation.) Platform-independent programming language build tool 110 first communicates with card manager 102 (step A). Card manager 102 puts platform-independent programming language build tool 110 in contact with an application 104 (step B). This allows platform-independent programming language build tool 110 to communicate directly with application 104 (step C). Note that card manager 102 can also delete objects from memory. This object deletion process is described in more detail below with reference to FIGS. 2-5.

EEPROM 122 contains a number of objects 112-114, which are accessed by applications 104-105. More specifically, application 104 accesses object 112, application 105 accesses objects 113 and 114, and application 106 accesses object 114. Other objects 115-116 (that have become unlinked) are not referenced by any application. It is desirable to delete these unreferenced objects to free up memory space in EEPROM 122. The process of deleting these unreferenced objects is described in more detail below with reference to FIGS. 2-5.

Also, note that some objects or portions of objects may be located within RAM 120.

Modifying a Platform-Independent Programming Language Build Tool

Figure 2:
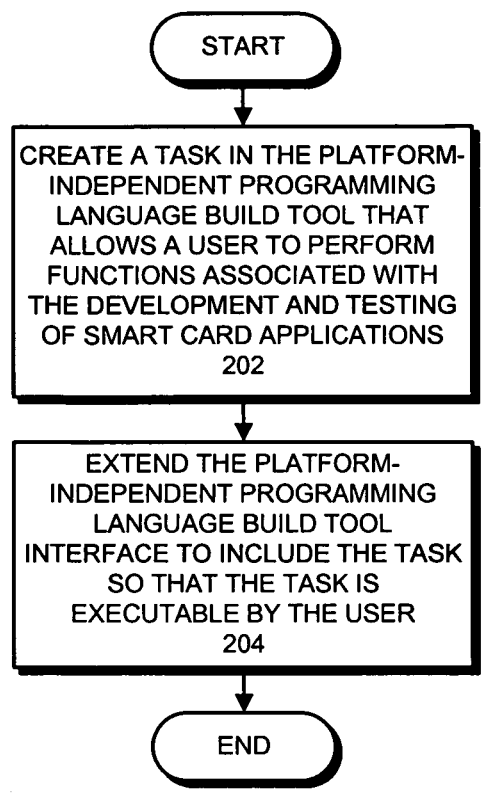
FIG. 2 presents a flowchart illustrating the process of modifying a platform-independent programming language build tool in accordance with an embodiment of the present invention.

One embodiment of the present invention provides a system for implementing modifying a platform-independent programming language build tool to aid in the development and testing of smart card applications, such as applications 104-106. FIG. 2 presents a flowchart illustrating the process of modifying a platform-independent programming language build tool in accordance with an embodiment of the present invention.

The system starts by creating a task in the platform-independent programming language build tool that allows a user to perform functions associated with the development and testing of smart card applications (step 202). Next, the system extends the platform-independent programming language build tool interface to include the task so that the task is executable by the user (step 204). Note that making the task part of the platform-independent programming language build tool interface reduces the overhead involved in performing functions associated with the development and testing of smart card applications. This allows the programmer to work directly with tasks within the platform-independent programming language build tool without having to perform the work included in maintaining external tasks and links.

Java Card Ant Tasks Implementation

The following is an implementation of Apache Ant™ tasks for Java Card™ tools in accordance with one embodiment of the present invention. Apache Ant is a Java-based build tool that is extended using Java classes, and is configured through XML-based configuration files. (see http://ant.apache.org/) Because Apache Ant uses Java classes and XML configuration files, the build files themselves are platform-independent. These Apache Ant tasks are basically designed to enhance user experience with the Java card tools and enable user to incorporate usage of Java card tools in their builds more easily and seamlessly.

The Java Card reference implementation comes with suite of Java Card tools to help developers develop, verify and test their Java Card applications. But to use these tools in an Apache Ant build requires using a standard Java Ant task. This makes using Java Card tools in an Apache Ant build very cumbersome and error-prone.

Java Card Ant tasks are designed to enhance user experience with Java Card tools and enable users to use Java Card tools in their Apache Ant builds more easily and seamlessly. Java Card Ant tasks are also designed to take care of some of the manual steps (such as editing of script files for CAP download) required to run some of the tools.

Figure 3:
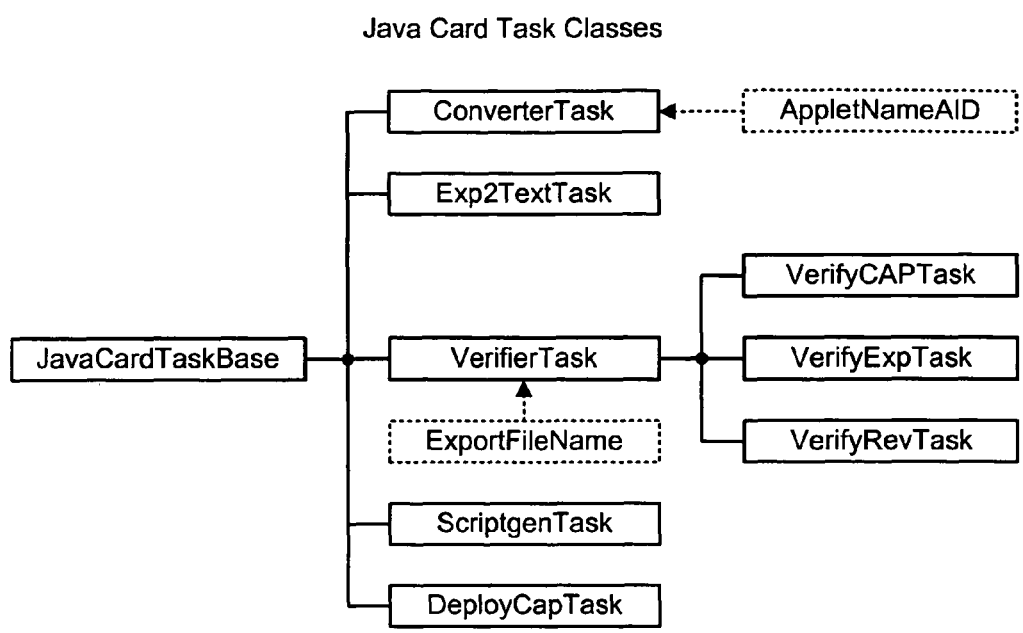
FIG. 3 illustrates a high-level design diagram for the Java card task classes in accordance with an embodiment of the present invention.

FIG. 3 illustrates a high-level design diagram for the Java card task classes in accordance with an embodiment of the present invention. Each of the following tasks are developed to facilitate usage of all the command line options, except the tasks that just show help messages, version information, etc., since usage of these options are not likely within an Apache Ant script. The following is a list of Apache Ant tasks for Java card tools:

ConverterTask: This task is used to enable usage of the Java card converter to create CAP files, Java Card Applet (JCA) files and Export (EXP) files;
Exp2TextTask: Converts an export file into a text file;
VerifyCAPTask: This task is used to verify CAP files;
VerifyExpTask: This task is used to verify EXP files;
VerifyRevTask: This task is used to verify binary compatibility between two versions of an export file;
ScriptgenTask: This task is used to generate Application Protocol Data Unit (APDU) script files for download in cref; and
DeployCAPTask: This task, given a CAP file, downloads the CAP file in the Java card c reference (cref) and saves the resulting EEPROM image in an output EEPROM file.

Note that all task classes inherit from JavaCardTaskBase class which is responsible for setting command line options that are common between all Java card tools. Each task class has "set" methods for each command line option/parameter and an execute method which is called by Apache Ant to start the task.

All of the tasks take a certain number of parameters provided through an Apache Ant script. For details on which of these parameters are required and which are optional, please refer to Java card user's guide.

ConverterTask

The converter task is used to invoke the Java card converter to create JCA, CAP and EXP files from an input package. Following is a list of converter options that can be used from within an Apache Ant script:

noverify: The verifier is not invoked to verify the generated CAP file. This option can be specified by putting noverify="true" in the conversion target in the Apache Ant Task;

JCA: Turns output on for JCA file;

EXP: Turns on output for EXP file;

CAP: Turns on output for CAP file;

packageName: Fully qualified package name;

packageAid: Package AID;

majorminorversion: Version number of package;

classDir: Root directory of where the class files for the package to be converted are present;

outputdirectory: Directory where output files will be put;

ExportPath: Path where the converter will look for export files;

Appletnameaid: This is a nested element since there can be more than one applets in a package. The values that are required for this element are appletName, which is the fully qualified name of the applet class, and the AID of the applet; and ConfigFile: If parameters to the converter are supplied in a config file, this parameter must be supplied since this provides a fully qualified path to the config file.

TABLE 1 illustrates exemplary usage of a converter task in accordance with an embodiment of the present invention.

TABLE 1

```
<target name="hello.cap" depends="hello.compile" >
  <convert
    JCA="true"
    EXP="true"
    CAP="true"
    packagename="com.sun.javacard.samples.HelloWorld"
    packageaid="0xa0:0x0:0x0:0x0:0x62:0x3:0x1:0xc:0x1"
    majorminorversion="1.0"
    classdir="${classroot}"
    outputdirectory="${classroot}">
    <appletnameaid
    appletname="com.sun.javacard.samples.
    HelloWorld.HelloWorld"
        aid="0xa0:0x0:0x0:0x0:0x62:0x3:0x1:0xc:0x1:0x1"/>
    <exportpath refid="export"/>
    <classpath refid="classpath"/>
  </convert>
</target>
```

Exp2TextTask

The Exp2Text task converts an export file into a human readable text file. Parameters that are input to this task are:

classdir: Root directory for input. This is the directory where the system will look for the export file;

Outputdirectory: This is the directory where the output will be written; and

PackageName: This is the fully qualified package name.

TABLE 2 illustrates exemplary usage of an "export-to-text" task in accordance with an embodiment of the present invention.

TABLE 2

```
<target name="hello.e2t" depends="hello.cap" >
  <exp2text
    packagename="com.sun.javacard.samples.HelloWorld"
    classdir="${classroot}"
    outputdirectory="${classroot }">
    <classpath refid="classpath"/>
  </exp2text >
</target >
```

Verifier Tasks

Verifier tasks are implemented as three different classes, which are VerifyCAPTask, VerifyRevTask, and VerifyExpTask. All these classes inherit from the base verifierTask class which is used to set command line options/parameters that are common to all the three tasks. Since multiple Export files can be mentioned on the verifier command line, export file name had to be a nested value in the task, which is why class ExportFileName has been declared to set export file names. Command line parameters that are common between all the verifier tasks iclude the following:

nowarn: Sets-no-warn option in the verifier so that the verifier doesn't throw any warning messages; and Verbose: Turns on verbose message output.

VerifyCAPTask

The VerifyCAP task is used to verify CAP files. Command line parameters and options that can be set for this task are as follows:

CapName (Required): Name of the CAP file that needs to be verified; and

ExportFileName (Required): This is a configured value, and must be declared as illustrated in the following example.

TABLE 3A illustrates exemplary usage of a "verify-CAP-file" task in accordance with an embodiment of the present invention.

TABLE 3A

```
<target name="VerifyCapTarget" depends="hello.cap" >
  <verifycap
  CapName="C:\Sun\jcdk\samples\classes\com\sun\javacard\samples\
    HelloWorld\javacard\HelloWorld.cap" >
  <exportfilename
    filename="C:\Sun\jcdk\samples\classes\com\sun\javacard\
    samples\HelloWorld\javacard\HelloWorld.exp" />
  <exportfilename
    filename="C:\java_card_kit-2_2_2\api_export_files\javacard\
    framework\javacard\framework.exp" />
  <exportfilename filename="C:\java_card_kit-2_2_2\
    api_export_files\java\lang\javacard\lang.exp" />
  <classpath refid="classpath"/>
  </verifycap>
</target>
```

VerifyRevTask

The VerifyRev task is used to verify binary compatibility between two different versions of an export file. This task only takes export files as arguments. This class only implements the execute method since it only requires two export files on the command line (handled in the super class).

TABLE 3B illustrates exemplary usage of a "verify-revision" task in accordance with an embodiment of the present invention.

TABLE 3B

```
<target name="VerifyRevTarget">
  <verifyrevision >
  <exportfilename filename="C:\java_card_kit-2_2_2\api_export_files\
    javacard\framework\javacard\framework.exp" />
```

TABLE 3B-continued

```
  <exportfilename filename="C:\java card_kit-2_2_2\api_export_files\
      javacard\framework\framework.exp" />
  <classpath refid="classpath"/>
  </verifyrevision >
</target >
```

VerifyExpTask

The VerifyExp task verifies an export file. This class also implements the execute method only, which is responsible for executing the task. Export file input is handled by the super class.

TABLE 3C illustrates exemplary usage of a "verify-export" task in accordance with an embodiment of the present invention.

TABLE 3C

```
<target name="VerifyExportTarget" depends="hello.cap" >
  <verifyexport >
  <exportfilename
filename="C:\samples\classes\com\sun\javacard\samples
      \HelloWorld\javacard\HelloWorld.exp" />
  <classpath refid="classpath"/>
  </verifyexport>
</target>
```

ScriptgenTask

The Scriptgen task is used to convert a CAP file into a script file for download in cref. Parameters required for this are:

OutFileName: This is the name of the resulting script file;

NoBeginEnd: This flag tells Scriptgen that CAP begin and CAP end APDUs are not to be included in the output file;

PackageName: This is the name of the package for which the script file is to be generated;

CapName: This is the name of the CAP file; and

FooterFile: This is the name of the footer file and path to the footer file which is to be appended to the script (which can be used to create applet instances etc.).

TABLE 4 illustrates exemplary usage of a "script-generation" task in accordance with an embodiment of the present invention.

TABLE 4

```
<target name="ScriptgenTarget" depends="hello.cap" >
  <scriptgen >
  CapName="C:\Sun\jcdk\samples\classes\com\sun\javacard\samples
      \HelloWorld\javacard\HelloWorld.cap"
  outFileName="C:\Sun\helloWorld.scr" >
  <classpath refid="classpath"/>
  </scriptgen>
</target>
```

DeployCAPTask

The DeployCap task is responsible for taking a CAP file, downloading it into cref, and creating a resulting cref EEPROM image (containing the downloaded CAP file). This also facilitates: (1) downloading CAP files in cref, since it hides the steps of using scriptgen to generate script files; (2) starting cref with proper parameters; and (3) running APDU-Tool to download the script file in to cref. Parameters required for this task are:

OutEEFile: The output EEPROM file name. This parameter is required.

InEEFile: The input EEPROM file name. This parameter is optional.

CapName: The name and full path of the CAP file which is to be downloaded in cref; and CrefExecutable: The full path and name of the cref executable.

TABLE 5 illustrates exemplary usage of a deployment task in accordance with an embodiment of the present invention.

TABLE 5

```
<target name="RunCref">
  <deploycap
  outEEFile="C:\jc\outEEFile"
  CrefExeName="C:\java_card_kit-2_2_2\bin\cref.exe"
  CapName="C:\Sun\jcdk\samples\classes\com\sun\javacard\samples\
      HelloWorld\javacard\HelloWorld.cap" >
  <classpath refid="classpath"/>
  </deploycap>
</target>
```

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for modifying a platform-independent programming language build tool to facilitate development and testing of smart card applications, the method comprising:
    creating a task in the platform-independent programming language build tool that allows a user to perform functions associated with development and testing of smart card applications, wherein task interfaces between the platform-independent programming language build tool and a smart card software development tool to enable the user to use the smart card software development tool in the platform-independent programming language build tool; and
    extending a user interface of the platform-independent programming language build tool to include the task so that the task is executable by the user.

2. The method of claim 1, wherein the platform-independent programming language build tool is an Apache Ant Java build tool.

3. The method of claim 1, wherein the smart card is a Java Card™.

4. The method of claim 1, wherein the task is a bridge to a predefined external task, and wherein parameters associated with the task are passed to the predefined external task.

5. The method of claim 4, wherein the predefined external task is one of:
    a Java Card Application Protocol Data Unit (APDU) tool;
    a Java Card converter tool;
    a Java Card verification tool;
    a Java Card CAP file generation tool;
    a Java Card mask generation tool;
    a Java Card script generation tool; and
    a Java Card deployment tool.

6. The method of claim 1, wherein extending the user interface for the platform-independent programming language build tool further involves creating an Application Programming Interface (API) which facilitates activating the task.

7. A non-transitory computer-readable storage medium storing instructions that when executed by a computer cause the computer to perform a method for modifying a platform-independent programming language build tool to facilitate development and testing of smart card applications, the method comprising:

creating a task in the platform-independent programming language build tool that allows a user to perform functions associated with development and testing of smart card applications, wherein task interfaces between the platform-independent programming language build tool and a smart card software development tool to enable the user to use the smart card software development tool in the platform-independent programming language build tool; and extending a user interface of the platform-independent programming language build tool interface to include the task so that the task is executable by the user.

8. The non-transitory computer-readable storage medium of claim 7, wherein the platform-independent programming language build tool is an Apache Ant Java build tool.

9. The non-transitory computer-readable storage medium of claim 7, wherein the smart card is a Java Card™.

10. The non-transitory computer-readable storage medium of claim 7, wherein the task is a bridge to a predefined external task, and wherein parameters associated with the task are passed to the predefined external task.

11. The non-transitory computer-readable storage medium of claim 10, wherein the predefined external task is one of:
a Java Card Application Protocol Data Unit (APDU) tool;
a Java Card converter tool;
a Java Card verification tool;
a Java Card CAP file generation tool;
a Java Card mask generation tool;
a Java Card script generation tool; and
a Java Card deployment tool.

12. The non-transitory computer-readable storage medium of claim 7, wherein extending the user interface for the platform-independent programming language build tool further involves creating an Application Programming Interface (API) which facilitates activating the task.

13. An apparatus for modifying a platform-independent programming language build tool to facilitate development and testing of smart card applications, comprising:

a platform-independent programming language build tool, wherein said platform-independent programming language build tool executes on a computer system configured to:

create a task in the platform-independent programming language build tool that allows a user to perform functions associated with development and testing of smart card applications, wherein task interfaces between the platform-independent programming language build tool and a smart card software development tool to enable the user to use the smart card software development tool in the platform-independent programming language build tool; and extend a user interface of the platform-independent programming language build tool to include the task so that the task is executable by the user.

14. The apparatus of claim 13, wherein the platform-independent programming language build tool is an Apache Ant Java build tool.

15. The apparatus of claim 13, wherein the smart card is a Java Card™.

16. The apparatus of claim 13, wherein the task is a bridge to a predefined external task, and wherein the computer system is further configured to extend the user interface for the platform-independent programming language build tool so that parameters associated with the task are passed to the predefined external task.

17. The apparatus of claim 16, wherein the predefined external task is one of:
a Java Card Application Protocol Data Unit (APDU) tool;
a Java Card converter tool;
a Java Card verification tool;
a Java Card CAP file generation tool;
a Java Card mask generation tool;
a Java Card script generation tool; and
a Java Card deployment tool.

18. The method of claim 1, wherein the task includes functions used by the platform-independent build tool to include the task in the user interface.

19. The computer-readable storage medium of claim 7, wherein the task includes functions used by the platform-independent build tool to include the task in the user interface.

20. The apparatus of claim 13, wherein the task includes functions used by the platform-independent build tool to include the task in the user interface.

* * * * *

UNITED STATES PATENT AND TRADEMARK OFFICE
CERTIFICATE OF CORRECTION

| | | |
|---|---|---|
| PATENT NO. | : 9,032,359 B1 | Page 1 of 1 |
| APPLICATION NO. | : 11/266845 | |
| DATED | : May 12, 2015 | |
| INVENTOR(S) | : Saqib J. Ahmad et al. | |

It is certified that error appears in the above-identified patent and that said Letters Patent is hereby corrected as shown below:

Specification

At column 6, line 21, delete "iclude" and replace it with the word -- include --

Claims

In claim 7 (at column 9, approximately line 15) immediately following the word "tool", delete the word "interface"

In claim 19 (at column 10, line 37), delete the phrase "The computer-readable storage medium" and replace it with the phrase -- The non-transitory computer-readable storage medium --

Signed and Sealed this
Twenty-sixth Day of April, 2016

Michelle K. Lee
*Director of the United States Patent and Trademark Office*